(No Model.)
R. S. JENNINGS.
PROCESS OF AND APPARATUS FOR TREATING AIR.
No. 303,165. Patented Aug. 5, 1884.
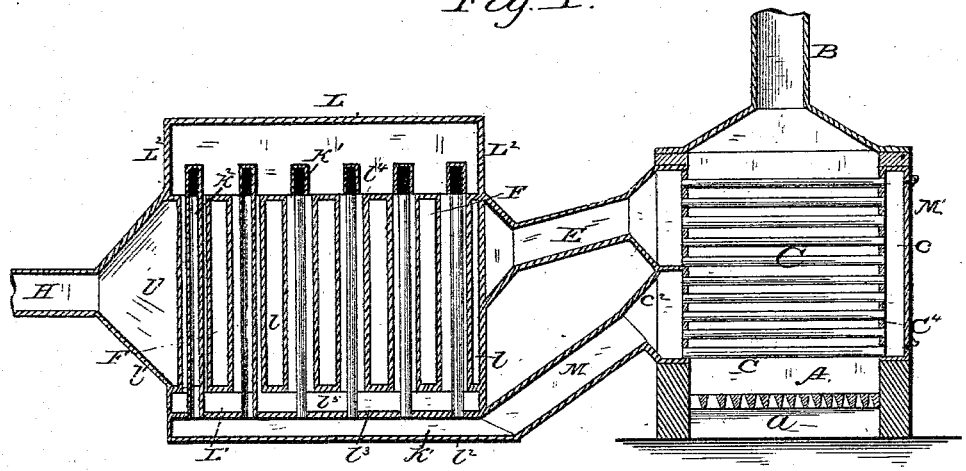
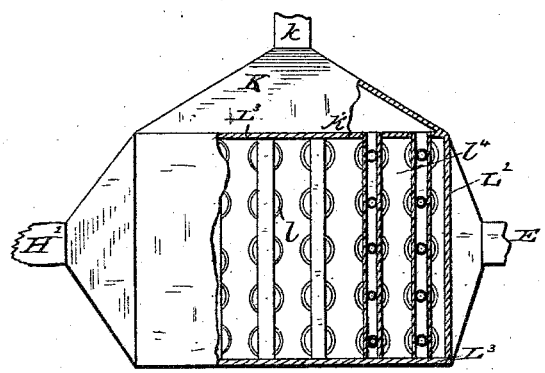
WITNESSES:
J. W. Reynolds
H. E. Bliss
INVENTOR
Ralph S. Jennings
BY Doubleday & Bliss
ATTORNEYS.

UNITED STATES PATENT OFFICE.

RALPH S. JENNINGS, OF BOSTON, MASSACHUSETTS.

PROCESS OF AND APPARATUS FOR TREATING AIR.

SPECIFICATION forming part of Letters Patent No. 303,165, dated August 5, 1884.

Application filed June 8, 1883. (No model.)

*To all whom it may concern:*

Be it known that I, RALPH S. JENNINGS, a citizen of the United States, residing at Boston, in the county of Suffolk and State of Massachusetts, have invented certain new and useful Improvements in Processes of and Apparatus for Treating Air, of which the following is a specification, reference being had therein to the accompanying drawings.

Figure 1 is a sectional view of an apparatus embodying my improvements. Fig. 2 is a view, partly in top plan and partly in section, of the cooling devices.

In the drawings, $k^2$ $k^2$ represent ducts or chambers adapted to receive the air and contain it when being initially cooled. Preferably the air is delivered to these ducts or chambers through chambers $k'$, into which they pass from another chamber, K. The latter may have a tube, as at $k$, communicating with the air, or may have a large aperture in place thereof. The air passes through the ducts or chambers $k^2$ to a receiving-chamber, K'.

In order to initially cool the air while passing through the tubes $k^2$, I place around them other tubes, $l$, which at their upper ends communicate with the chamber L, the latter being adapted to be filled with cold water, or with other liquid refrigerant. The water or refrigerant passes from the chamber L through the tubes $l$ around the air-tubes $k^2$. The water is at the bottom received into a chamber, L', from which it can be withdrawn through a stop-cock, as at $l'$, or by means of a trap.

The devices above described are supported in a chest, box, or housing having a bottom, as at $l^2$, a diaphragm or partition, $l^3$, which holds the lower ends of air-pipes $k^2$, a partition, $l^4$, at the upper ends of the water-tubes $l$, and a partition, $l^5$, at the lower ends of the water-tubes $l$, vertical walls $L^2$ at the ends, and walls $L^3$ at the sides. It will be seen that there is a chamber, F, between the diaphragms or partitions $l^4$ $l^5$, and between the end walls, $L^2$, and the side walls, $L^3$. This chamber F is adapted to receive the air at a subsequent stage through an aperture at $l^6$, and from it the air escapes at $l^7$. From the chamber K' the air passes through a duct, M, to the air-heating devices. The latter, as shown, consist of the furnace A, with metal tubes C C arranged across the fire-chamber, these being supported in upright plates $c$ $c^2$. A portion of these tubes communicate with the duct M, and through them the air passes to the chamber $C^4$. The products of combustion arising around the tubes heat the air both when passing toward the chamber $C^4$ and when returning therefrom through the upper tubes. After the air leaves the furnace it passes through the duct E to the chamber F. Here it comes in contact with the outer surfaces of the tubes $l$, which latter are kept cold by the water inside, as above described.

H is a duct which receives the air after passing through the chamber F, and which carries it to the drying room or apartment, where it is to be used in the treatment of any of the various materials to which it can be applied.

The passage of the air through the apparatus described may be induced by a blast-fan or by a suction-fan, or by both, experience, however, having shown that a suction-fan is, under most circumstances, superior to any of the other devices employed for this purpose.

I am aware of the fact that use has been made of devices for drying, adapted to cause a "round and round" current of air—that is to say, a current of air which is first drawn from the drying-room, then forced into contact with a cooling agent, then into contact with a heating agent, and then again delivered to the drying-room. With such devices, however, the action is merely to remove by condensation the moisture with which the air has been surcharged while in the drying-room, and it has been found that it is impracticable to treat in that way successively the large volumes of air which I desire to use. I withdraw from the open atmosphere the air which I employ, and which is not surcharged with moisture, as it is when leaving a drying-room, and therefore the apparatus with which the air is treated is not compelled to do the large amount of work required when the other process is followed. Again, under many circumstances, it is desirable to remove entirely the air which has been withdrawn from the drying-room—that is to say, allow it to escape into the open air—and when the apparatus is so arranged as to constantly take a fresh supply of air from the open atmosphere that in the dry-room can be also allowed to escape into the open air.

Under many circumstances the initial cooling of the air will result in so lowering the relative humidity thereof that the subsequent heating of it renders it rapidly efficient in the removal of moisture from the articles treated by it. The tubes C may be heated to a very high degree to effect the decomposition remaining in the air after passing through the cooler; but I do not herein claim any of the features relating to that process, as I have made them the subject-matter of another application. In either event—that is to say, both when the air is heated sufficiently high to effect the decomposition of the moisture and when it is heated merely for the purpose of effecting the relative humidity—the subsequent cooling action becomes advantageous, as I can thereby insure that the temperature shall be brought back to a degree which is required, and at the same time insure that every particle of air shall be sufficiently heated, and in this respect my process is superior to those heretofore followed, in which air has been blown over hot coals or hot surfaces and carried directly to the drying-room.

Having shown one form of mechanism adapted to carry out my process, and having my improvements embodied therein, I wish it to be understood that I do not limit myself to the specific form of apparatus shown, as it can be modified to a considerable extent without departing from the spirit of the invention.

I do not in this case claim any of the combinations, processes, or inventions specifically set forth in the claims in my other pending applications, respectively numbered as follows: 65,006, 73,148, 86,026, 87,468, 87,469, 98,699, 121,265, and 124,602, but reserve the right to claim in said other applications the matters therein shown and described, and not herein claimed.

What I claim is—

1. The herein-described method of treating air prior to its use in a drying-room, it consisting in first subjecting it to the action of a cooler while inclosed in a chamber or duct, subsequently heating the air, and then cooling it, substantially as set forth.

2. The combination of means for condensing moisture from the air while the latter is at its normal temperature, said means having cold surfaces, against which the air passes, an air-heater, to which the air passes from the condenser, and a second air-cooling surface or surfaces, against which the air is conducted after being heated, said devices or means being arranged substantially as set forth, whereby the air is affected by them all before entering the drying-room or coming in contact with the materials to be dried or treated thereby.

3. The combination of a receptacle adapted to hold a body of water, a duct in contact with said water, through which passes air at a normal temperature, a duct the walls of which are also in contact with said body of water, means for heating the air, and devices which guide the air from the heater to the last-said duct, substantially as set forth.

4. The combination of the water-pipes, the air-pipes within the water-pipes, the air-chamber on the outside of the water-pipes, and means for connecting the air-pipes with the air-chambers, substantially as set forth.

5. The combination of the vertical air-pipes in the cooler, the chamber which receives the air, the furnace, the water-pipes surrounding the air-pipes, the air-chamber surrounding the water-pipes, and the duct which leads the air to the furnace and back from the furnace into the chamber around the water-pipes, substantially as set forth.

In testimony whereof I affix my signature in presence of two witnesses.

RALPH S. JENNINGS.

Witnesses:
C. E. PRATT,
H. I. NASH.